(12) United States Patent
Chiu et al.

(10) Patent No.: US 12,345,942 B2
(45) Date of Patent: Jul. 1, 2025

(54) OPTICAL ADJUSTMENT MECHANISM OF WEARABLE DEVICE

(71) Applicant: Quanta Computer Inc., Taoyuan (TW)

(72) Inventors: Chung-Yu Chiu, Taoyuan (TW); Chun-Lung Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 496 days.

(21) Appl. No.: 17/820,276

(22) Filed: Aug. 17, 2022

(65) Prior Publication Data
US 2023/0333346 A1    Oct. 19, 2023

(30) Foreign Application Priority Data

Apr. 18, 2022  (TW) ................................. 111203919

(51) Int. Cl.
*G02B 7/02*   (2021.01)
*G02B 7/00*   (2021.01)
*G02B 27/01*  (2006.01)

(52) U.S. Cl.
CPC ............ *G02B 7/005* (2013.01); *G02B 7/021* (2013.01); *G02B 27/0172* (2013.01)

(58) Field of Classification Search
CPC .... G02B 7/005; G02B 7/021; G02B 27/0172; G02B 27/0176; G02B 2027/0178

USPC ......................................................... 359/819
See application file for complete search history.

(56) References Cited

U.S. PATENT DOCUMENTS

| | | | |
|---|---|---|---|
| 9,423,629 B2* | 8/2016 | Suzuka ................ | G02B 27/646 |
| 2014/0218798 A1* | 8/2014 | Suzuka ............. | G02B 13/0015 |
| | | | 359/557 |
| 2015/0110482 A1* | 4/2015 | Suzuka ................ | G02B 27/646 |
| | | | 396/55 |
| 2015/0160438 A1* | 6/2015 | Okuda ............... | G02B 13/0065 |
| | | | 359/557 |
| 2021/0255427 A1* | 8/2021 | Liang ...................... | G02B 5/005 |
| 2022/0057595 A1* | 2/2022 | Takahashi ................ | G02B 7/10 |
| 2022/0317409 A1* | 10/2022 | Yang ........................ | G02B 3/04 |
| 2024/0118513 A1* | 4/2024 | Yang ...................... | G02B 7/021 |

* cited by examiner

*Primary Examiner* — William R Alexander
(74) *Attorney, Agent, or Firm* — McClure, Qualey & Rodack, LLP

(57) ABSTRACT

An optical adjustment mechanism of wearable device includes a fixed portion, a movable portion, and an adjusting element. The fixed portion includes an outer frame connected with a first optical element, and the first optical element has an optical axis, wherein the outer frame forms a sectional plane along a direction parallel to the optical axis. The movable portion is movable relative to the fixed portion, and includes a holder. The holder holds a second optical element and is movably connected to the outer frame. The adjusting element connects the movable portion and the fixed portion, wherein the movable portion may be moved relative to the fixed portion by the adjusting element.

9 Claims, 16 Drawing Sheets

OPTICAL ADJUSTMENT MECHANISM OF WEARABLE DEVICE

CROSS-REFERENCE TO RELATED APPLICATIONS

The present application claims priority of Taiwan Patent Application No. 111203919, filed 18 Apr. 2022, which is incorporated by reference herein in its entirety.

BACKGROUND OF THE DISCLOSURE

Field of the Disclosure

The present invention relates to an optical adjustment mechanism, especially to an optical adjustment mechanism of wearable device.

Description of the Related Art

In order to be more ergonomic, the current wearable devices (e.g., virtual reality (VR) devices) are usually designed a chamfer on a frame near a user's nose to be close to the nose shape for wearing comfort. However, in such light weighting design, diopter of lens cannot be adjusted, and there is no additional space in this wearable device to accommodate a pair of glasses. That is, such a design is limited to users with normal eyesight, and it is difficult for myopic users to achieve the same virtual reality experience.

BRIEF SUMMARY OF THE DISCLOSURE

Therefore, in the present embodiments, an optical adjustment mechanism of wearable device is provided, which has a designed chamfer structure for ergonomics, thus improving wearing comfort. In addition, a user may also adjust diopter easily according to the user's own eyesight to achieve a good virtual reality experience.

An embodiment of the present disclosure provides an optical adjustment mechanism of wearable device includes a fixed portion, a movable portion, and an adjusting element. The fixed portion includes an outer frame connected with a first optical element, and the first optical element has an optical axis, wherein the outer frame forms a sectional plane along a direction parallel to the optical axis. The movable portion is movable relative to the fixed portion, and includes a holder. The holder holds a second optical element and is movably connected to the outer frame. The adjusting element connects the movable portion and the fixed portion, wherein the movable portion may be moved relative to the fixed portion by the adjusting element.

According to some embodiments of the present disclosure, the outer frame includes at least one restricting portion, the holder includes at least one protruding portion, the adjusting element includes at least one guiding portion, and the at least one protruding portion passes through the at least one restricting portion and is received in the at least one guiding portion. The optical adjustment mechanism further includes at least one fixing element, wherein the outer frame further includes at least one fitting portion, and the adjusting element further includes at least one limiting portion, the at least one fixing portion passes through the at least one limiting portion to fit with the at least one fitting portion, and the at least one fixing element is disposed between a left end side and a right end side of the at least one limiting portion. The adjusting element further includes a pushing portion extending parallel to the optical axis. When the pushing portion is pushed, the fixing element is converted from being in contact with the left end side of the limiting portion to being in contact with the right end side of the limiting portion, the protruding portion of the holder moves to a maximum height along the guiding portion, and there is a maximum distance between the second optical element and the first optical element.

According to some embodiments of the present disclosure, the optical adjustment mechanism further includes a fine-tuning portion, the fine-tuning portion includes a fine-tuning lever and a gear, the fine-tuning lever is connected to the gear and is rotatably fixed to the outer frame, wherein an outer wall of the adjusting element is provided with a plurality of teeth, and the gear engage with the teeth.

According to some embodiments of the present disclosure, the guiding portion is a concave structure disposed on an inner wall of the adjusting element to engage with the protruding portion, wherein the adjusting element further includes a pulling portion, which is arranged on an opposite side of the sectional plane and extends parallel to the optical axis, wherein the restricting portion is an elongated hole extending parallel to the optical axis, and has an upper edge to restrict a movement range of the movable portion. When the pulling portion is pulled along the direction parallel to the optical axis, and the protruding portion engaged with the guiding portion contacts the upper edge of the restricting portion of the outer frame, there is a minimum distance between the second optical element and the first optical element.

According to some embodiments of the present disclosure, the optical adjustment mechanism further includes a damping element disposed between the adjusting element and the outer frame, wherein an outer wall of the outer frame is provided with at least one groove, and the damping element fills the at least one groove and is connected to the adjusting element. The adjusting element further has at least one recessed portion, and the at least one recessed portion has a concave strip structure along an inner wall of the adjusting element, and the at least one recessed portion is disposed to correspond to the groove.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

Figure 1:
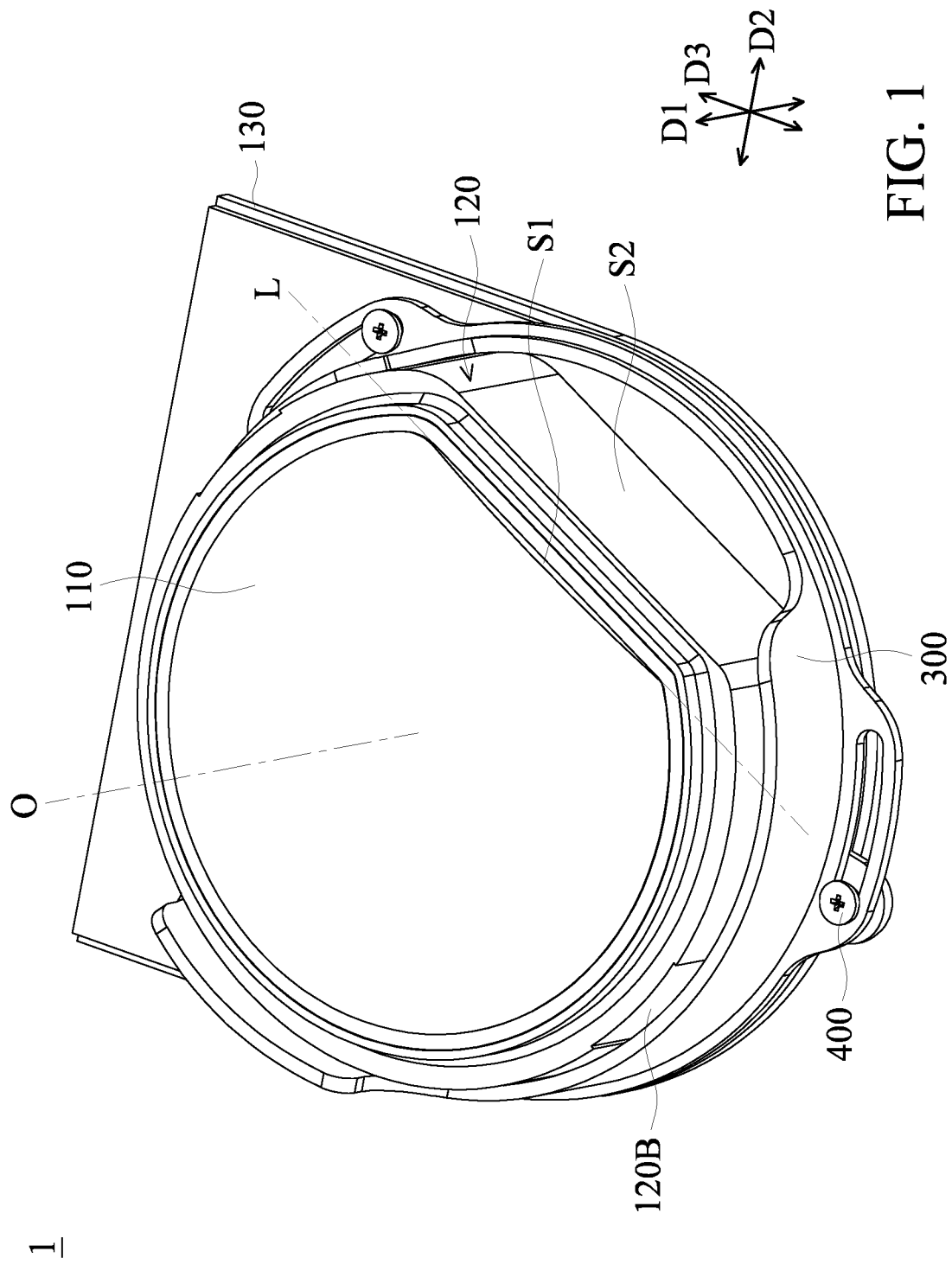
FIG. 1 is a perspective view of an optical adjustment mechanism of wearable device according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that when an element is referred to as being "connected to" or "coupled to" another element, the element may be directly connected or coupled to another element, or there are one or more elements between the two elements. In addition, the use of ordinal numbers such as first, second, and third does not necessarily imply a sense of order, but can be multiple instances to distinguish actions or structures.

Reference to "one embodiment" or "an embodiment" throughout the specification means that particular features, structures, or characteristics described in conjunction with the embodiment are included in at least one embodiment. Therefore, the sentences "in one embodiment" or "in an embodiment" appearing in various places throughout the specification do not necessarily all refer to the same embodiment. In addition, in one or more embodiments, specific features, structures, or characteristics may be combined in any suitable manner.

Figure 2:
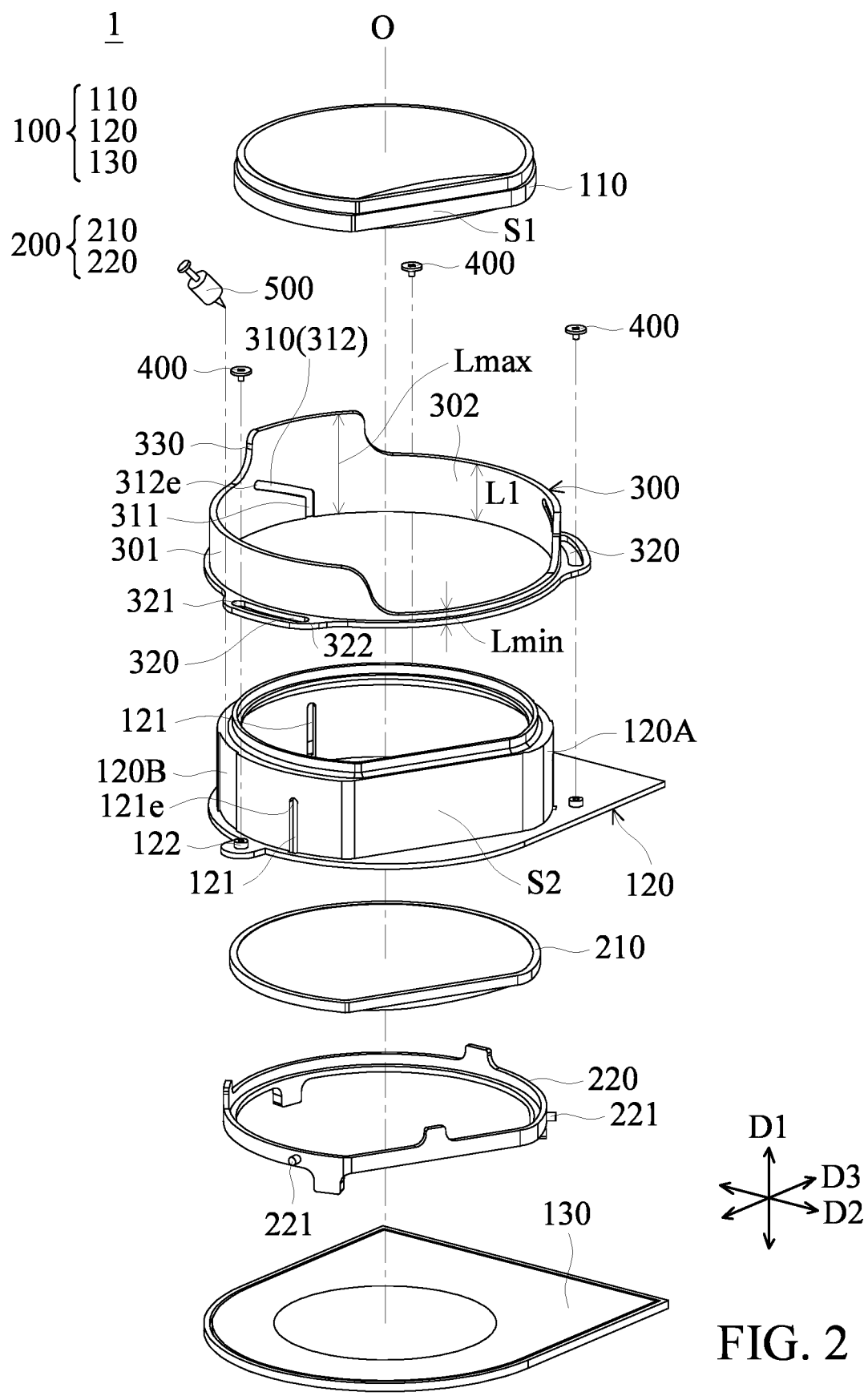
FIG. 2 is an exploded view of the optical adjustment mechanism of wearable device according to an embodiment of the present disclosure.
Figure 3:
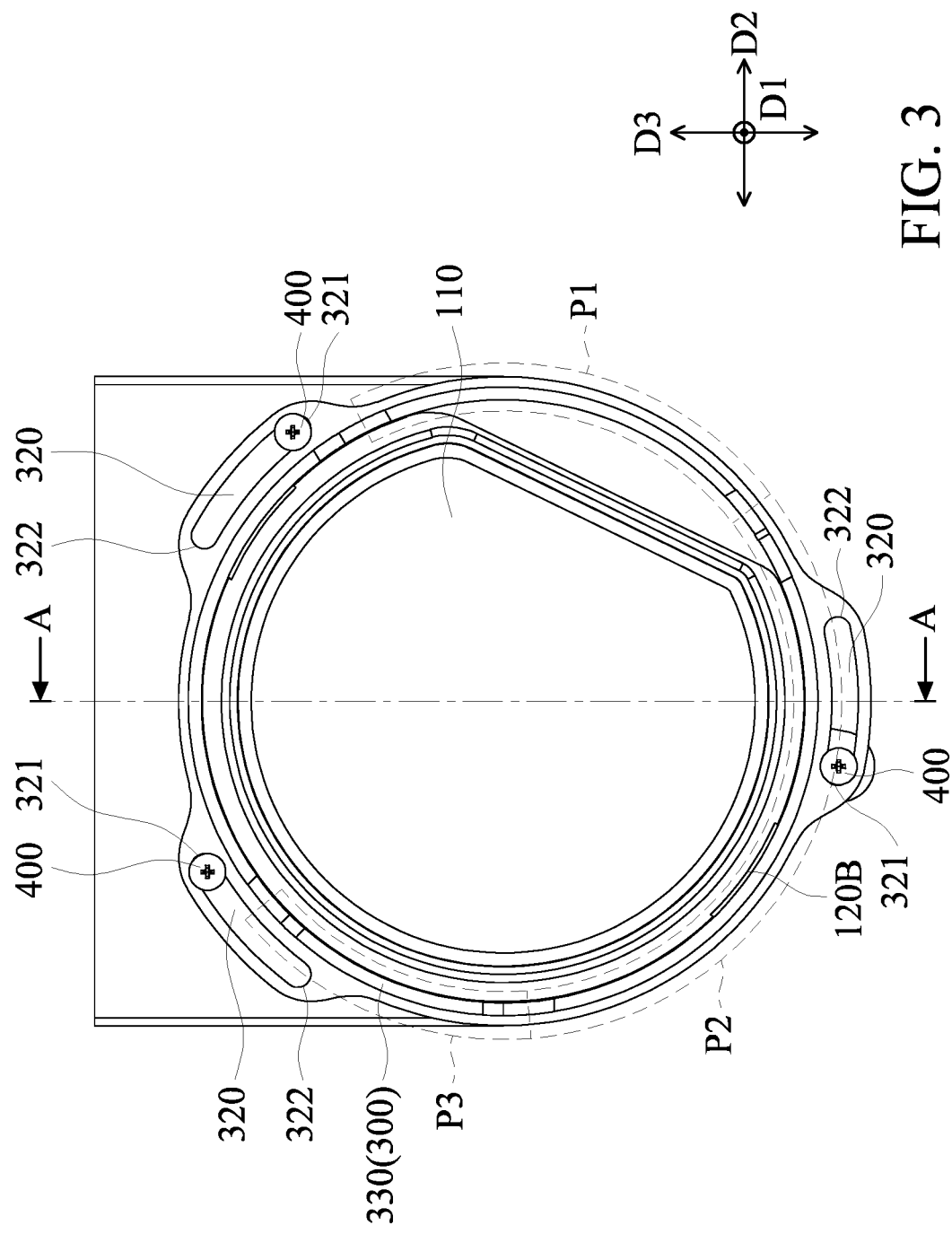
FIG. 3 is a front view of the optical adjustment mechanism of wearable device according to an embodiment of the present disclosure.

First, refer to FIG. 1 to FIG. 3. FIG. 1 is a perspective view of an optical adjustment mechanism 1 of wearable device according to an embodiment of the present disclosure. FIG. 2 is an exploded view of the optical adjustment mechanism 1 of wearable device according to an embodiment of the present disclosure. FIG. 3 is a front view of the optical adjustment mechanism 1 of wearable device according to an embodiment of the present disclosure. In this embodiment, the wearable device is described by taking a head-mounted virtual reality device as an example. It should be noted that, for the sake of clarity, the drawings only show a partial structure of the optical adjustment mechanism 1 of wearable device that corresponding to a user's left eye, and other partial structure corresponding to the user's right eye (not shown) may have a symmetrical or similar structure.

The optical adjustment mechanism 1 of wearable device includes a fixed portion 100, a movable portion 200, an adjusting element 300, at least one fixed element 400, and a plurality of damping elements 500.

The fixed portion 100 includes a first optical element 110, an outer frame 120, and a display element 130. The first optical element 110 may be an eyepiece or a combination of eyepieces, and the user views the virtual image from the first optical element 110. The first optical element 110 (a left eye part) has an optical axis O, and a first optical element in a right eye part (not shown) also has an optical axis. In order to clearly illustrate the configuration of each element of the optical adjustment mechanism 1 in this embodiment, an extending direction of the optical axis O is set as a first direction D1, a connecting direction of the optical axis O of the left eye part and the optical axis of the right eye part is a second direction D2, and the direction perpendicular to the first direction D1 and the second direction D2 is a third direction D3.

The first optical element 110 forms a sectional plane S1 along a direction parallel to the optical axis O, and the sectional plane S1 is neither perpendicular nor parallel to the second direction D2 or the third direction D3. More specifically, as shown in FIGS. 1 and 3, when viewed along the first direction D1, the first optical element 110 has a nearly circular shape, and the first optical element 110 is cut by a virtual line L along the first direction D1 to form a sectional plane S1 at a side (a right side of FIG. 3) close to the user's nose.

The outer frame 120 is a hollow cylindrical structure, extending parallel to the first direction D1. A side of the outer frame 120 is connected to the first optical element 110, and an opposite side of the outer frame 120 is connected to the display element 130. When viewed along the first direction D1, a shape of the outer frame 120 corresponds to a shape of the first optical element 110, so that the outer frame 120 also forms a sectional plane S2 along a direction that is parallel to the optical axis O. In this embodiment, the sectional planes S1 and S2 are shown as planes, but the sectional planes S1 and S2 may also be changed into curved planes as required.

Conventional wearable device using circular eyepieces usually has to be additionally designed a shape on the outer frame to fit with user's nose, which may increase the overall volume and weight of the wearable device. Or the circular eyepieces of the wearable device must to be designed smaller to prevent weighting down user's nose. In contrast, in this embodiment, the first optical element 110 and the outer frame 120 are designed with the sectional planes S1 and S2 near user's nose, so that the volume and weight of the wearable device may be reduced, and thus improving the wearing. On the other hand, the eyepieces may also be designed to be larger without weighting down user's nose, and increase the user's visual range and enhance the experience of virtual reality.

As shown in FIG. 2, the outer frame 120 includes at least one restricting portion 121 and at least one fitting portion 122. The restricting portion 121 is an elongated hole extending parallel to the first direction D1 and has an upper edge 121e for restricting a moving range of the movable portion 200. The fitting portion 122 is disposed close to the display element 130. The fitting portion 122 is used to cooperate with the fixing element 400. More specifically, for example, the fixing element 400 may be a screw, and the fitting portion 122 and the display element 130 are provided with corresponding screw holes, so the outer frame 120 and the display element 130 are fixed by locking the fixing element 400 to the display element 130 through the fitting portion 122.

The display element 130 may be a display screen, and an image displayed on the display element 130 is determined by a sensing element and a computing element (not shown), and is projected on the retina of the user through elements provided in the outer frame 120.

The movable portion 200 is movable relative to the fixed portion 100. When viewed along the second direction D2, the movable portion 200 is disposed between the first optical element 110 and the display element 130. The movable portion 200 includes a second optical element 210 and a holder 220. The second optical element 210 and the first optical element 110 have substantially the same shape and are arranged along the first direction D1.

The holder 220 holds the second optical element 210 and has at least one protruding portion 221 that protrudes away from the optical axis O. The protruding portion 221 is provided corresponding to the restricting portion 121 of the outer frame 120. More specifically, the protruding portion 221 is cylindrical, and its diameter is slightly smaller than a short side of the elongated restricting portion 121, so the protruding portion 221 may pass through the restricting portion 121 and move along a long side of the elongated restricting portion 121 in the first direction D1 from a minimum height Hmin (refer to FIG. 5) to a maximum height Hmax (refer to FIG. 8).

The adjusting element 300 is a substantially annular structure, having an outer wall 301 and an inner wall 302. When viewed along the first direction D1, the adjusting element 300 is farther away from the optical axis O than the outer frame 120. As shown in FIG. 3, the annular structure may be divided into a first portion P1, a second portion P2, and a third portion P3, and the first portion P1, the second portion P2, and the third portion P3 respectively have different lengths along the first direction D1. The first portion P1 is a portion close to the sectional plane S2, and has a minimum length Lmin along the first direction D1 relative to the second portion P2 and the third portion P3, so as to maximize a nose rest space formed between the sectional plane S2 and the first portion P1, thus improving the wearing comfort and the overall light weight. The third portion P3 is a portion including a pushing portion 330 (described below), and has a maximum length Lmax along the first direction D1 relative to the first portion P1 and the second portion P2. The second portion P2 is located between the first portion P1 and the third portion P3, and a length L1 of the second portion P2 along the first direction D1 is at least greater than the maximum height Hmax which the protruding portion 221 of the holder 220 may be moved to.

The adjusting element 300 includes at least one guiding portion 310, at least one limiting portion 320, and the pushing portion 330. The guiding portion 310 is a concave structure disposed on the inner wall 302 of the adjusting element 300 for accommodating a part of the protruding portion 221. That is, the protruding portion 221 passes through the restricting portion 121 and is accommodated in the guiding portion 310. The guiding portion 310 has a first segment portion 311 and a second segment portion 312. The first segment portion 311 is connected to the second segment portion 312, and the first segment portion 311 is closer to the display element 130 than the second segment portion 312. The first segment portion 311 extends from the bottom of the inner wall 302 in parallel with the first direction D1 so as to be assembled with the movable portion 200. The second segment 312 extends along a direction neither parallel nor perpendicular to the first direction D1 to near to the first optical element 110. A guiding direction of the guiding portion 310 is formed by the extending direction of the second segment 312.

The limiting portion 320 extends outward along the outer wall 301 of the adjusting element 300, and forms an annular structure surrounding the fixing element 400. The limiting portion 320 restricts the movement of the adjusting element 300 in a plane perpendicular to the first direction D1. More specifically, as shown in FIG. 3, the fixing element 400 passes through the limiting portion 320 and then is locked to the display element 130 through the fitting portion 122, and is located between a left end side 321 and a right end side 322 of the limiting portion 320. When the user pushes the adjusting element 300, a moving range of the adjusting element 300 is limited by the contact between the fixing element 400 and the left end side 321 or the right end side 322 of the limiting portion 320.

The pushing portion 330 is disposed on an opposite side of the sectional plane S2, that is, close to the user's ear side (the left side in FIG. 3), and extends parallel to the first direction D1 to protrude over the outer frame 120 and the first optical element 110, so the user may easily find a point of application to push the adjusting element 300.

In this embodiment, an amount of the restricting portion 121, the fitting portion 122, the protruding portion 221, the guiding portion 310, and the restricting portion 320 is three, respectively, which are arranged approximately symmetrically to the optical axis O. Such a configuration makes the optical adjustment mechanism 1 of wearable device may be adjusted in a relatively balanced state to avoid out of center, but it is not limited to this, and the amount may be increased or decreased as required.

In addition, the damping element 500 may be disposed between the adjusting element 300 and the outer frame 120 to fix the adjusting element 300. More specifically, as shown in FIG. 1 and FIG. 2, an outer wall 120A of the outer frame 120 is provided with at least one groove 120B, and the adjusting element 300 is fixed by using the damping element 500 (such as damping oil) to fill the groove 120B and connect to the adjusting element 300. Or the adjusting element 300 is fixed by coating the damping element 500 on contact portions of the adjusting element 300, the fixing element 400, and the outer frame 120. In this way, the movable portion 200 is further fixed.

Figure 4:
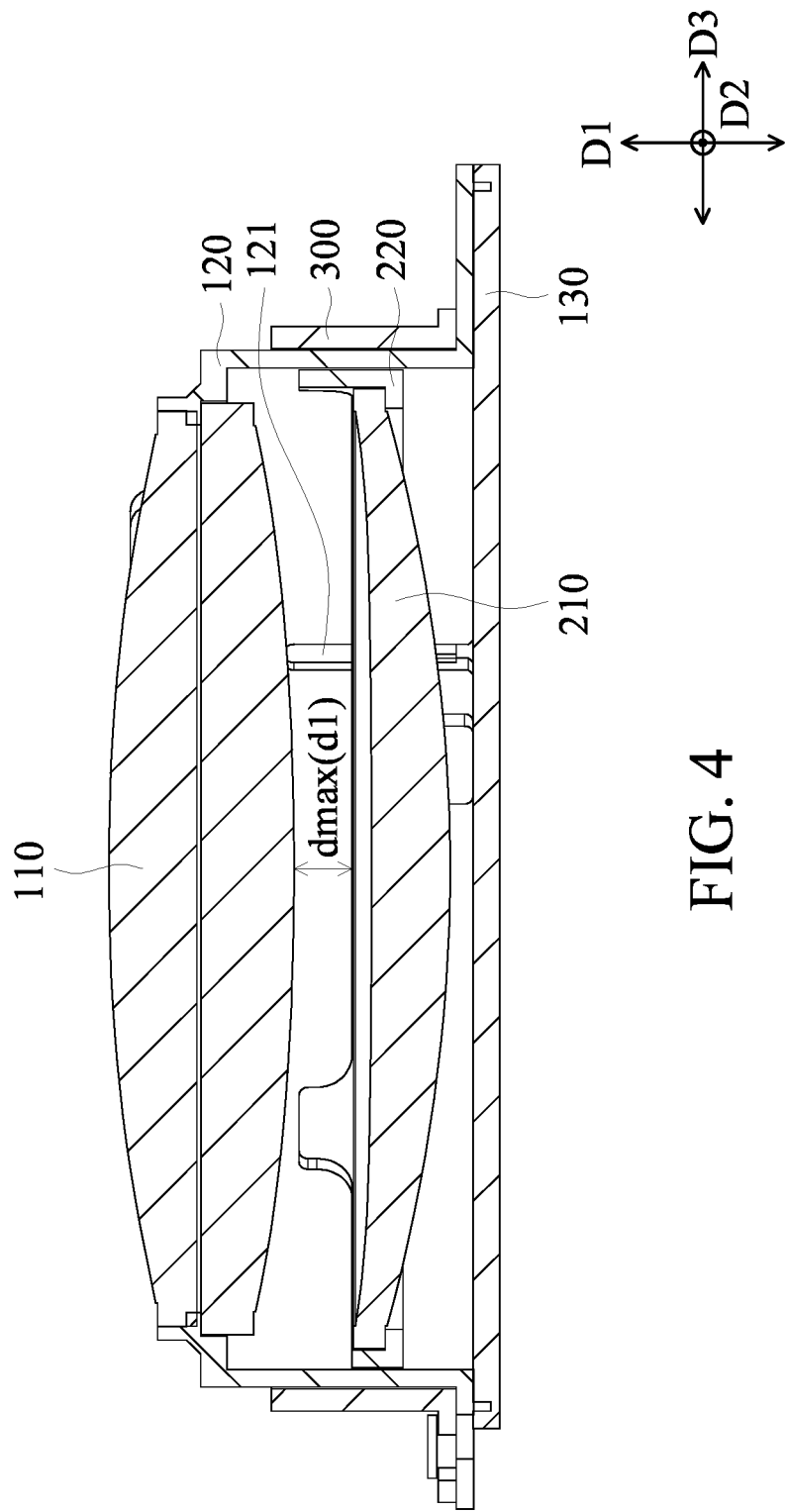
FIG. 4 is a cross-sectional view of the optical adjustment mechanism of wearable device cut along the line A-A in FIG. 3.
Figure 5:
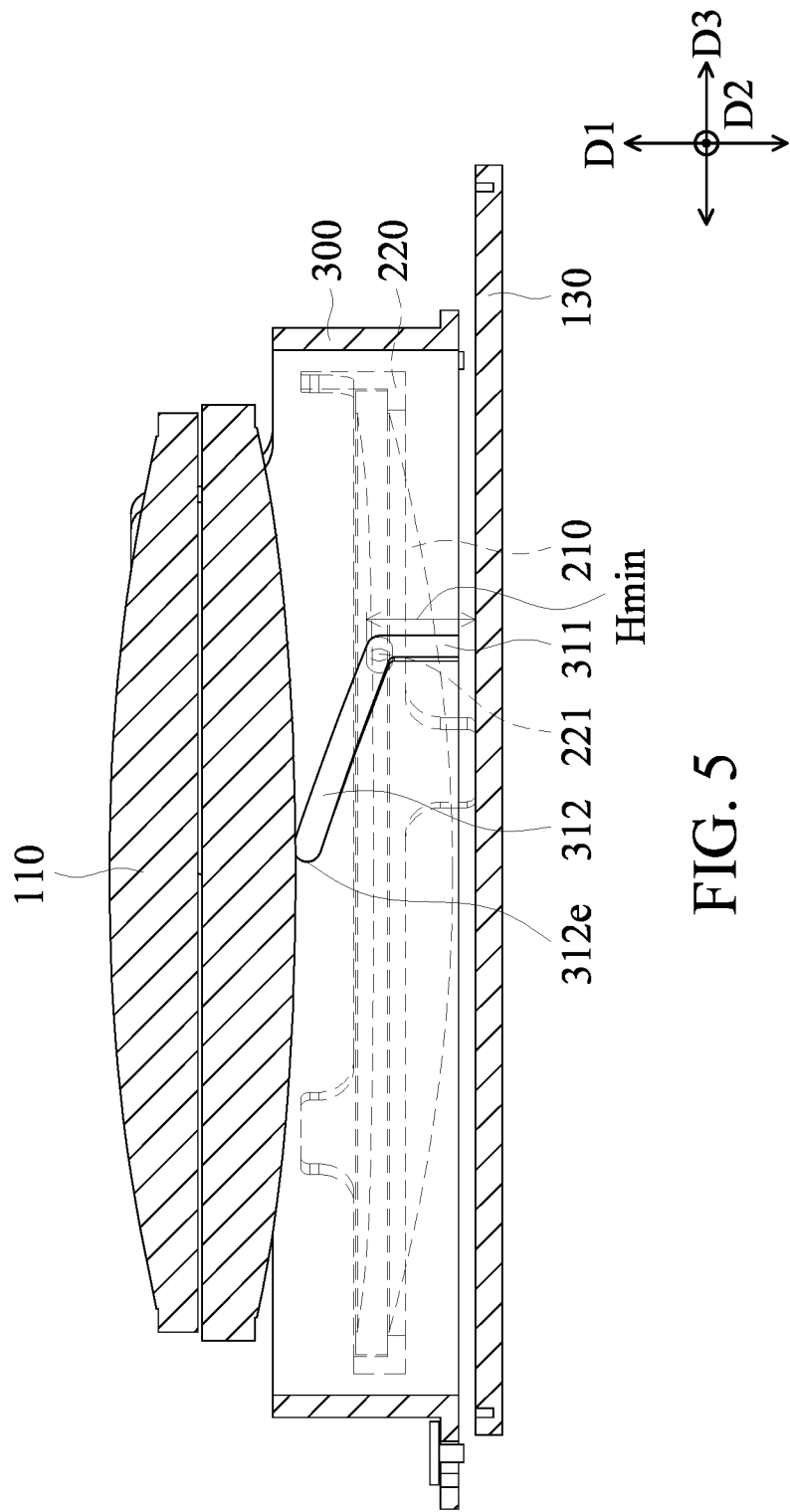
FIG. 5 is a cross-sectional view of a partial structure of the optical adjustment mechanism of wearable device cut along the line A-A in FIG. 3.
Figure 6:
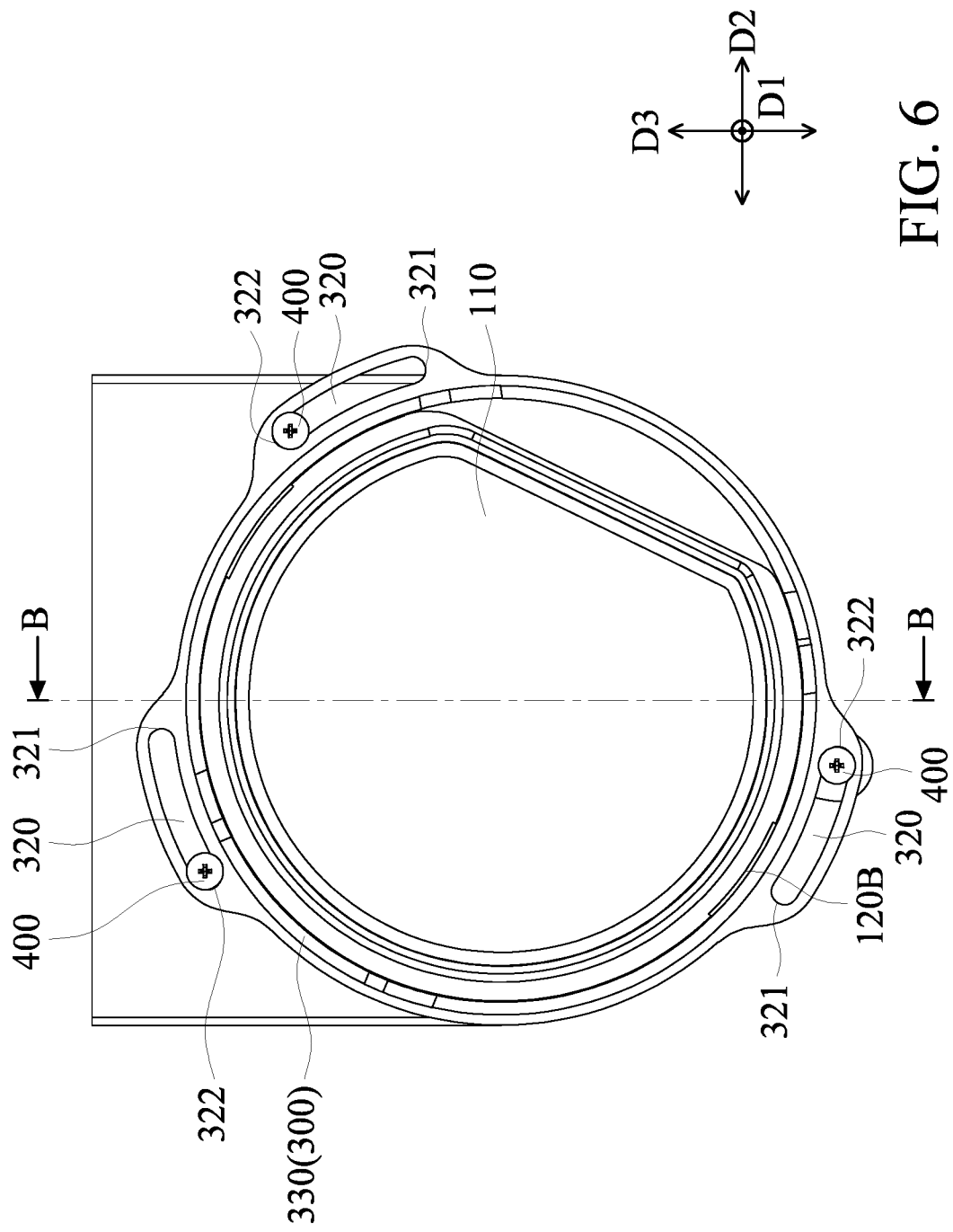
FIG. 6 is a front view of the optical adjustment mechanism of wearable device according to an embodiment of the present disclosure.
Figure 7:
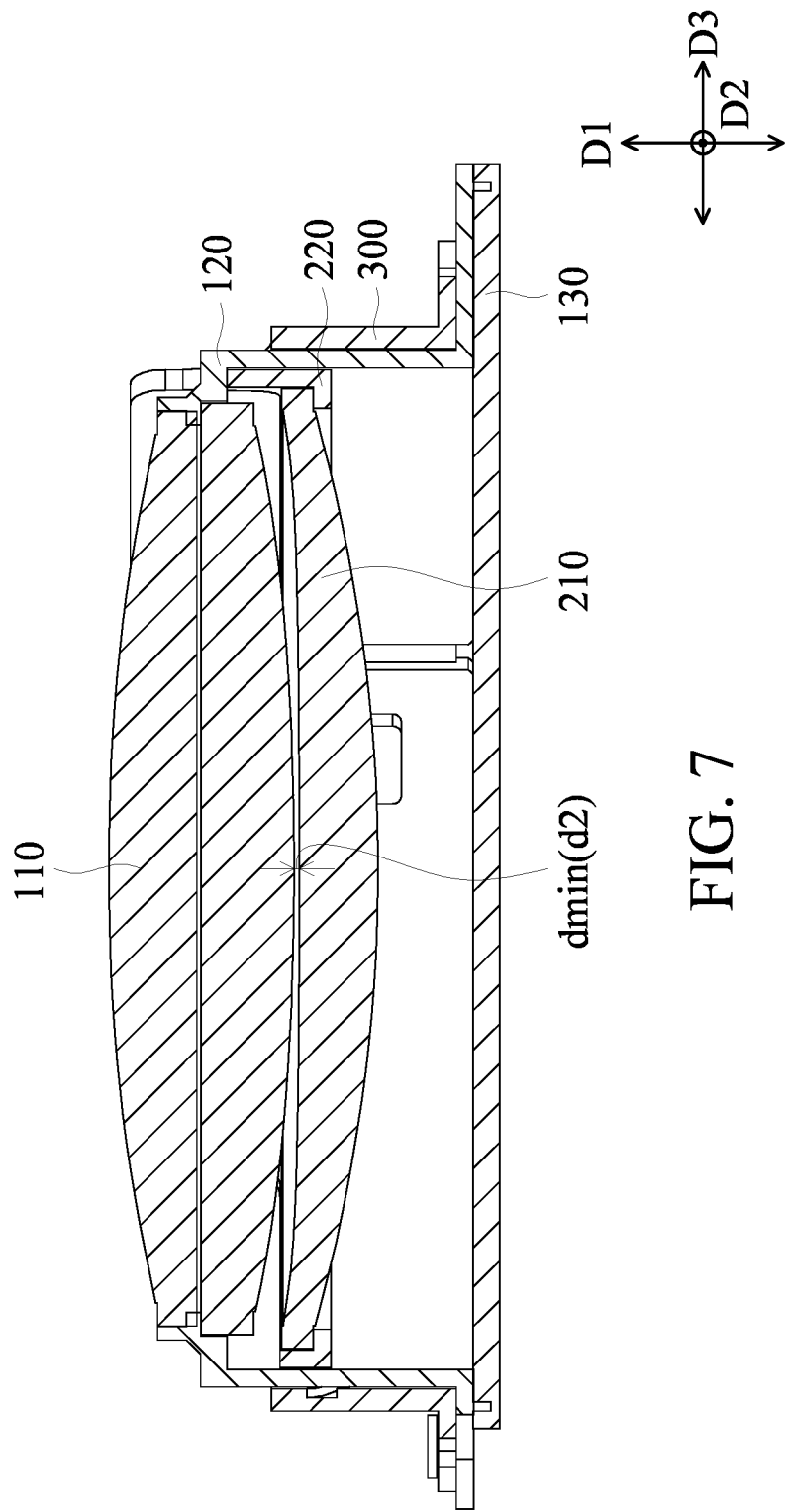
FIG. 7 is a cross-sectional view of the optical adjustment mechanism of wearable device cut along the line B-B in FIG. 6.
Figure 8:
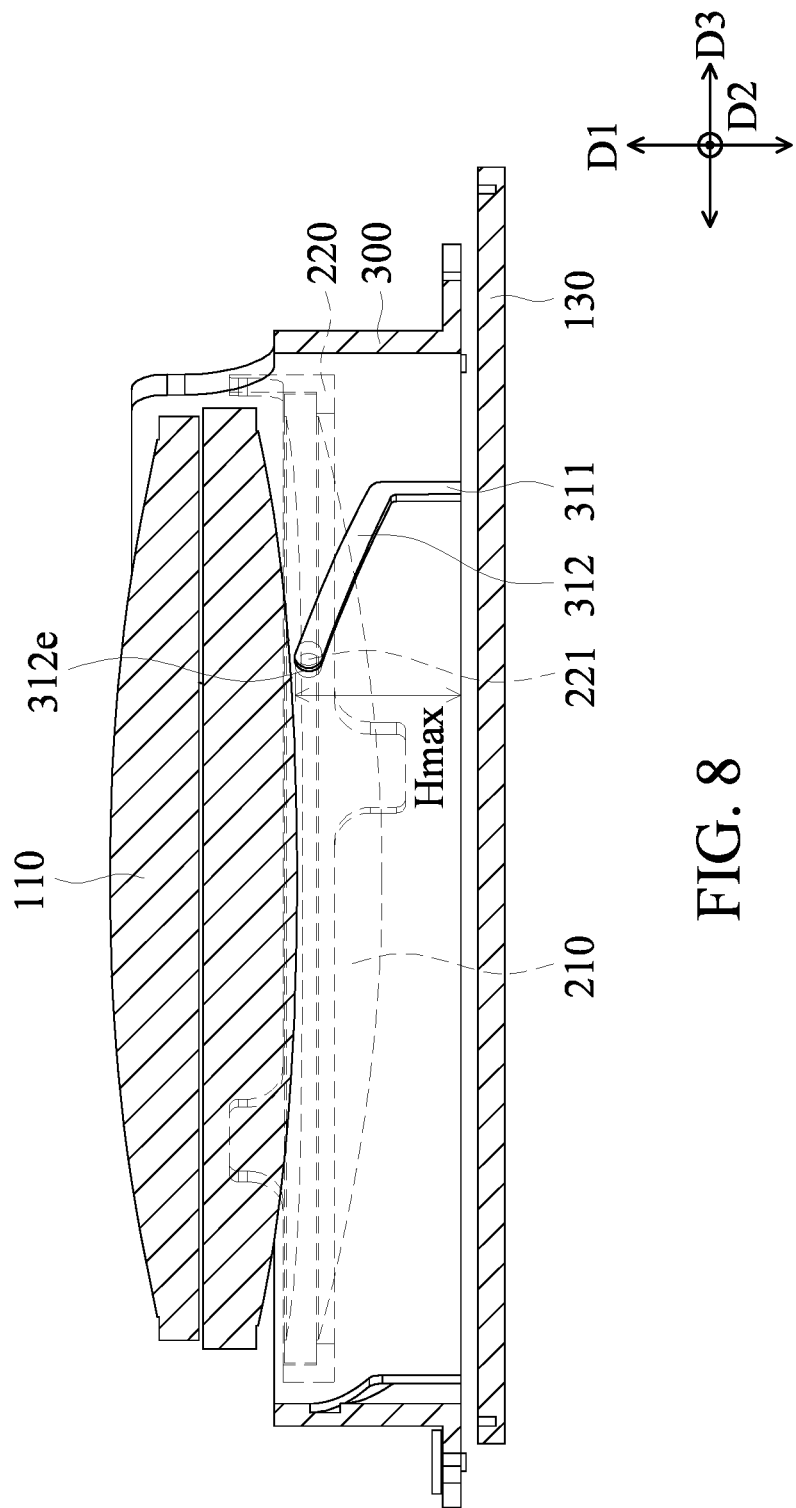
FIG. 8 is a cross-sectional view of a partial structure of the optical adjustment mechanism of wearable device cut along the line B-B in FIG. 6.

Refer to FIGS. 3 to 8 to describe how the movable portion 200 be adjusted to move relative to the fixed portion 100 by the adjusting element 300. FIG. 4 is a cross-sectional view of the optical adjustment mechanism 1 of wearable device cut along the line A-A in FIG. 3. FIG. 5 is a cross-sectional view of a partial structure of the optical adjustment mechanism 1 of wearable device cut along the line A-A in FIG. 3. FIG. 6 is a front view of the optical adjustment mechanism 1 of wearable device according to an embodiment of the present disclosure. FIG. 7 is a cross-sectional view of the optical adjustment mechanism 1 of wearable device cut along the line B-B in FIG. 6. FIG. 8 is a cross-sectional view of a partial structure of the optical adjustment mechanism 1 of wearable device cut along the line B-B in FIG. 6. It should be noted that, in order to clearly illustrate positions of each element, the outer frame 120 is not shown in FIGS. 5 and 8, and the movable portion 200 is transparently represented by a dotted line.

After the user wears a wearable device on the head, the user can push the pushing portion 330 in the clockwise direction with a finger to rotate the adjusting element 300. FIGS. 3 to 5 show an initial state of the optical adjustment mechanism 1 of wearable device, and the initial state is a state that the user has not rotated the adjusting element 300. At this time, as shown in FIG. 3, the three fixing elements 400 are in contact with the left end sides 321 of the three limiting portions 320, respectively. And as shown in FIGS. 4 and 5, the protruding portion 221 of the holder 220 passes through the limiting portion 121 of the outer frame 120 and is accommodated between the first segment portion 311 and the second segment portion 312 of the guiding portion 310. There is a first distance d1 between the second optical element 210 and the first optical element 110, and the first distance d1 is a maximum distance dmax between the second optical element 210 and the first optical element 110.

When the user continues to push the pushing portion 330 in the clockwise direction to make the fixing element 400 be in contact with the right end side 322 of the limiting portion 320 from the left end side 321 of the limiting portion 320, that is, to make the right end side 322 of the limiting portion 320 be in contact with the fixing element 400 and may not be pushed any more, a rotating limitation of the adjusting element 300 is reached as shown in FIG. 6. On the other hand, as shown in FIGS. 7 and 8, the protruding portion 221 accommodated in the guiding portion 310 is moved to the maximum height Hmax along the guiding portion 310. More specifically, the protruding portion 221 is moved relatively to an end 312e of the second segment portion 312 from a position between the first segment portion 311 and the second segment portion 312. At this time, the protruding portion 221 is moved to the maximum height Hmax, and there is a second distance d2 which is smaller than the first distance d1 between the second optical element 210 and the first optical element 110, and the second distance d2 is a minimum distance dmin between the second optical element 210 and the first optical element 110.

That is, the user pushes the adjusting element 300 to move the second element 210 between the first distance d1 and the second distance d2 to achieve continuous diopter conversion within a certain range. When the adjusting element 300 is adjusted to an appropriate position, that is, when the user adjusts the adjusting element 300 according to his/her own eyesight so that the image presented by the display element 130 may be clearly seen, the adjusting element 300 may be fixed by arranging the damping element 500 between the adjusting element 300 and the outer frame 120 to keep this best wearing condition of the user.

Figure 9:
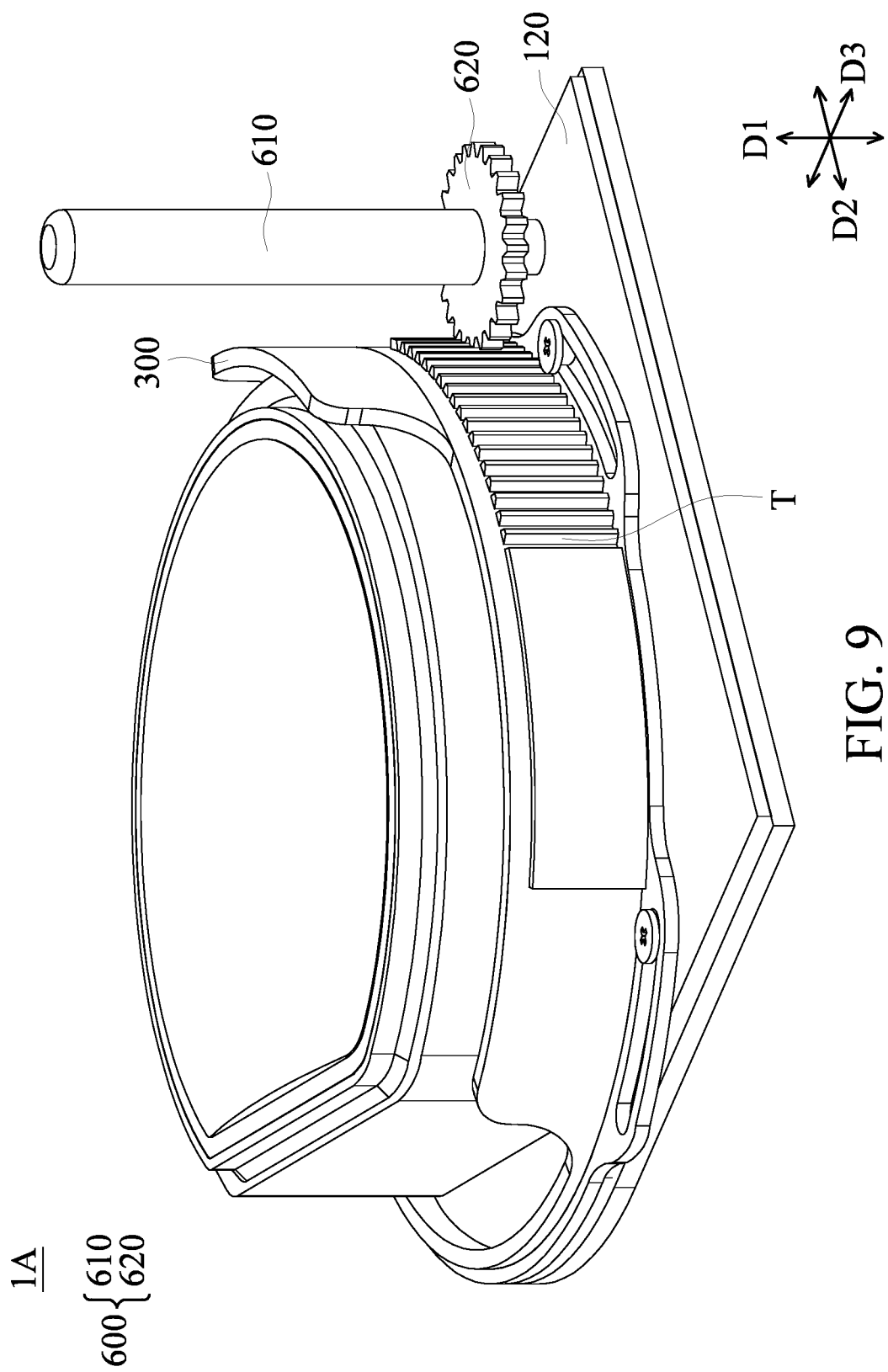
FIG. 9 is a perspective view of the optical adjustment mechanism of wearable device according to another embodiment of the present disclosure.

Refer to FIG. 9, which is a perspective view of an optical adjustment mechanism 1A of wearable device according to another embodiment of the present disclosure. In this embodiment, the optical adjustment mechanism 1A of wearable device has a structure similar to that of the optical adjustment mechanism 1 of wearable device, so the same elements are labeled with the same numerals, and the description is not repeated.

The optical adjustment mechanism 1A of wearable device includes a fine-tuning portion 600. The fine-tuning portion 600 includes a fine-tuning lever 610 and a gear 620. The fine-tuning lever 610 is connected to the gear 620, and is rotatably fixed to the outer frame 120. The outer wall 301 of the element 300 is provided with a plurality of teeth T, and the gear 620 may engage with the teeth T.

Therefore, with the above configuration, in addition to directly pushing the adjusting element 300 to change the diopter, the user may further rotate the fine-tuning lever 610 to make the gear 620 engage with the teeth T and drive the adjusting element 300 to rotate slightly, so as to achieve a more precise adjustment.

Figure 10:
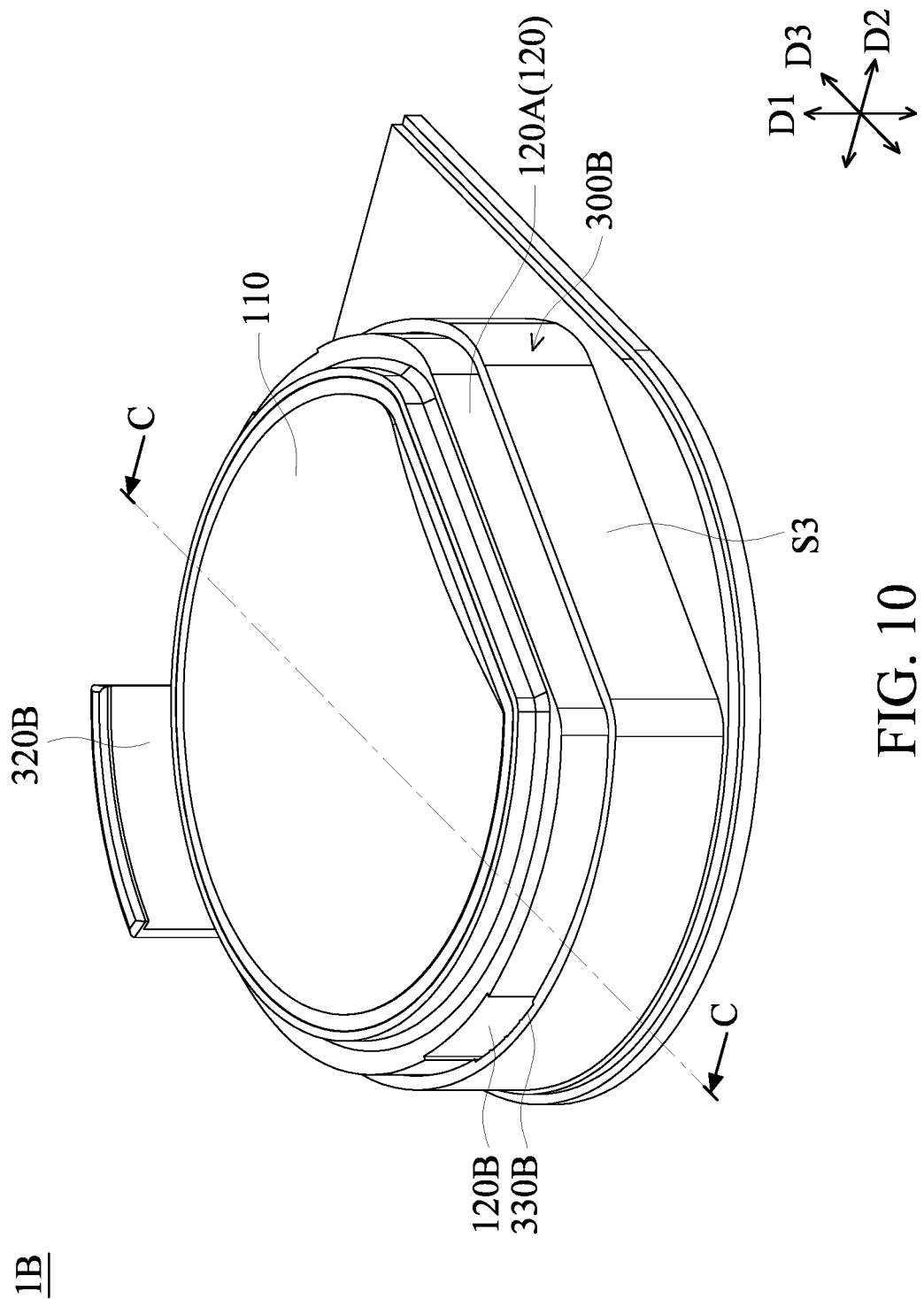
FIG. 10 is a perspective view of the optical adjustment mechanism of wearable device according to another embodiment of the present disclosure.
Figure 11:
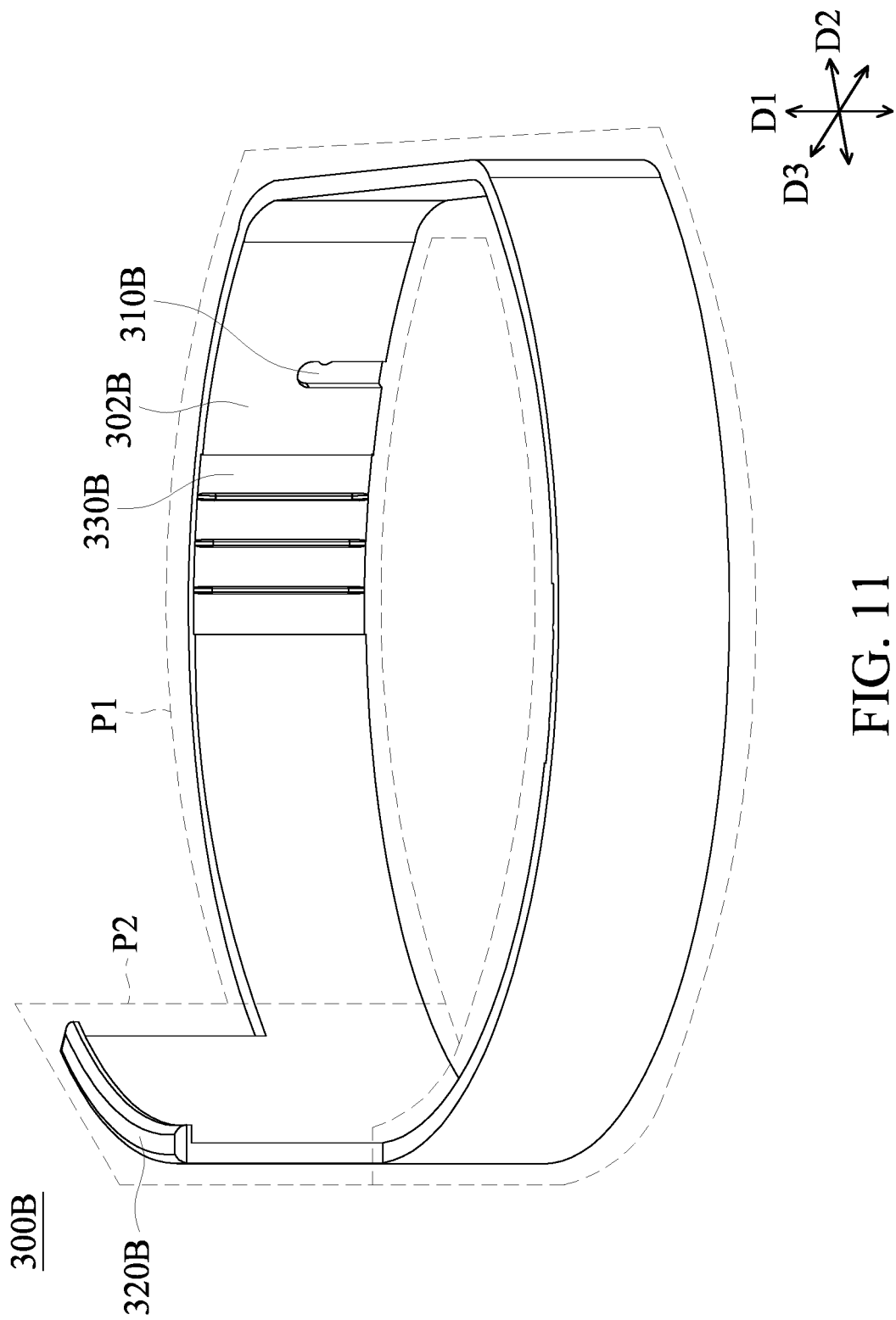
FIG. 11 is a perspective view of an adjusting element according to another embodiment of the present disclosure.

Refer to FIG. 10 and FIG. 11. FIG. 10 is a perspective view of an optical adjustment mechanism 1B of wearable device according to another embodiment of the present disclosure. FIG. 11 is a perspective view of an adjusting element 300B according to another embodiment of the present disclosure. In this embodiment, the optical adjustment mechanism 1B has a structure similar to that of the optical adjustment mechanism 1, so the same elements are labeled with the same numerals, and the description is not repeated.

The optical adjustment mechanism 1B of wearable device includes an adjusting element 300B. As shown in FIG. 11, the adjusting element 300B is a annular structure and is disposed on the outer wall 120A surrounding the outer frame 120. When viewed along the first direction D1, a shape of the adjusting element 300B also corresponds to a shape of the first optical element 110 to form a sectional plane S3. The annular structure may be divided into a first portion P1 and a second portion P2 with different heights along the first direction D1, and the second portion P2 is a portion including a pulling portion 320B (described below), which is higher than the first portion P1.

The adjusting element 300B includes at least one guiding portion 310B, a pulling portion 320B, and a plurality of recessed portions 330B. The guiding portion 310B is a concave structure, which is disposed on an inner wall 302B of the adjusting element 300B for accommodating a part of the protruding portion 221 and engaging with the protruding portion 221. More specifically, in this embodiment, the guiding portion 310B has a shape similar to that of the protruding portion 221, so that the protruding portion 221 may be firmly engaged with the guiding portion 310B and substantially fixed to the guiding portion 310B.

The pulling portion 320B is disposed on an opposite side of the sectional plane S3, that is, close to the user's ear side. The pulling portion 320B extends parallel to the first direction D1 to protrude over the outer frame 120 and the first optical element 110, so that the user may easily find a point of application to pull the adjusting element 300B.

The recessed portions 330B are concave strip structures along the inner wall 302B of the adjusting element 300B, and the recessed portions 330B are disposed to correspond to a groove 120B of the outer frame 120 to increase a contact area with the damping element 500. More specifically, the damping element 500 may fill a space formed between the recessed portion 330B and the groove 120B to fix the adjusting element 300B and the outer frame 120. By increasing the contact area with the damping element 500, a fixed strength of the adjusting element 300B and the outer frame 120 may be increased.

Figure 12:
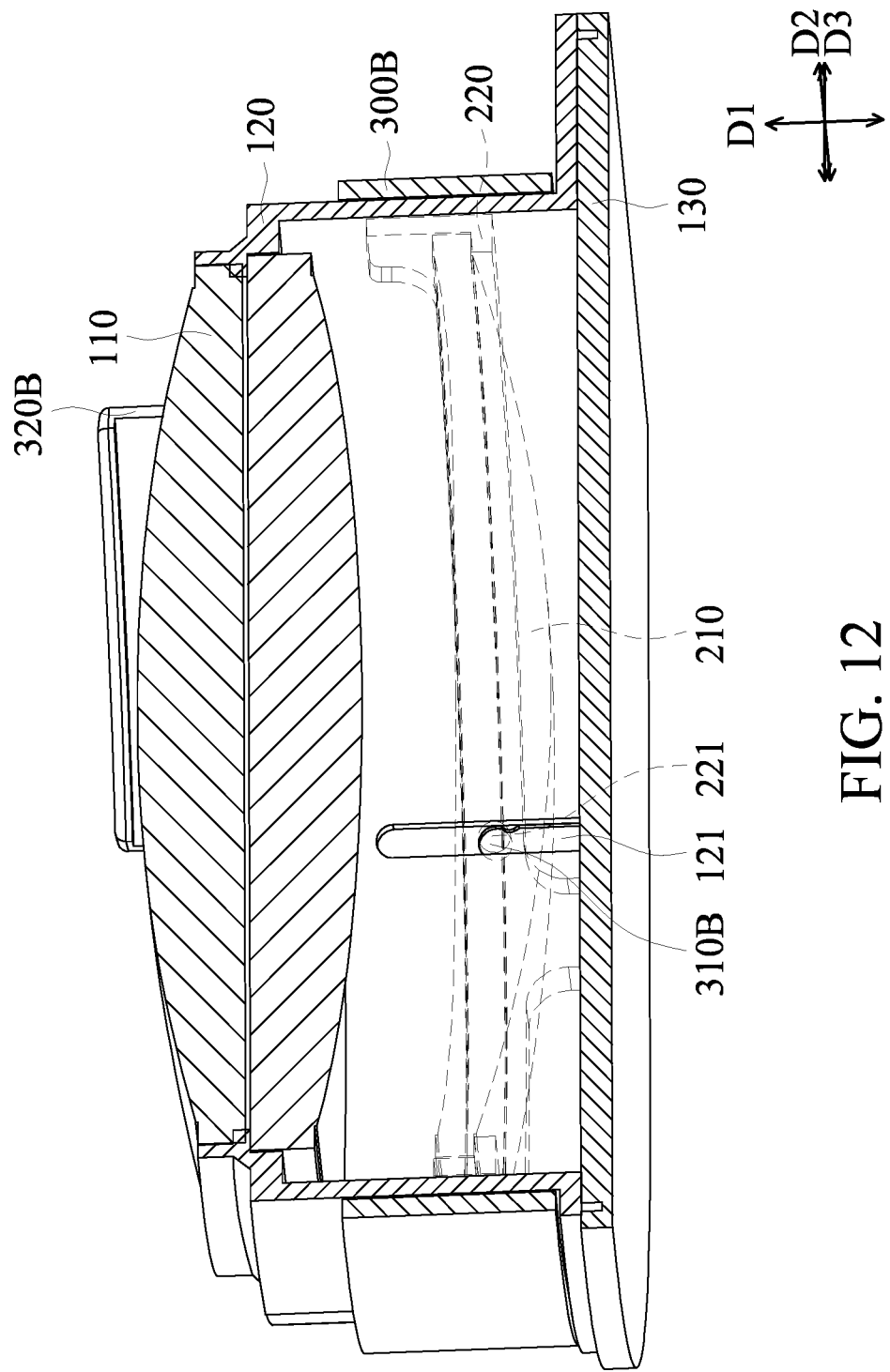
FIG. 12 is a cross-sectional view of the optical adjustment mechanism of wearable device cut along the C-C line in FIG. 10.
Figure 13:
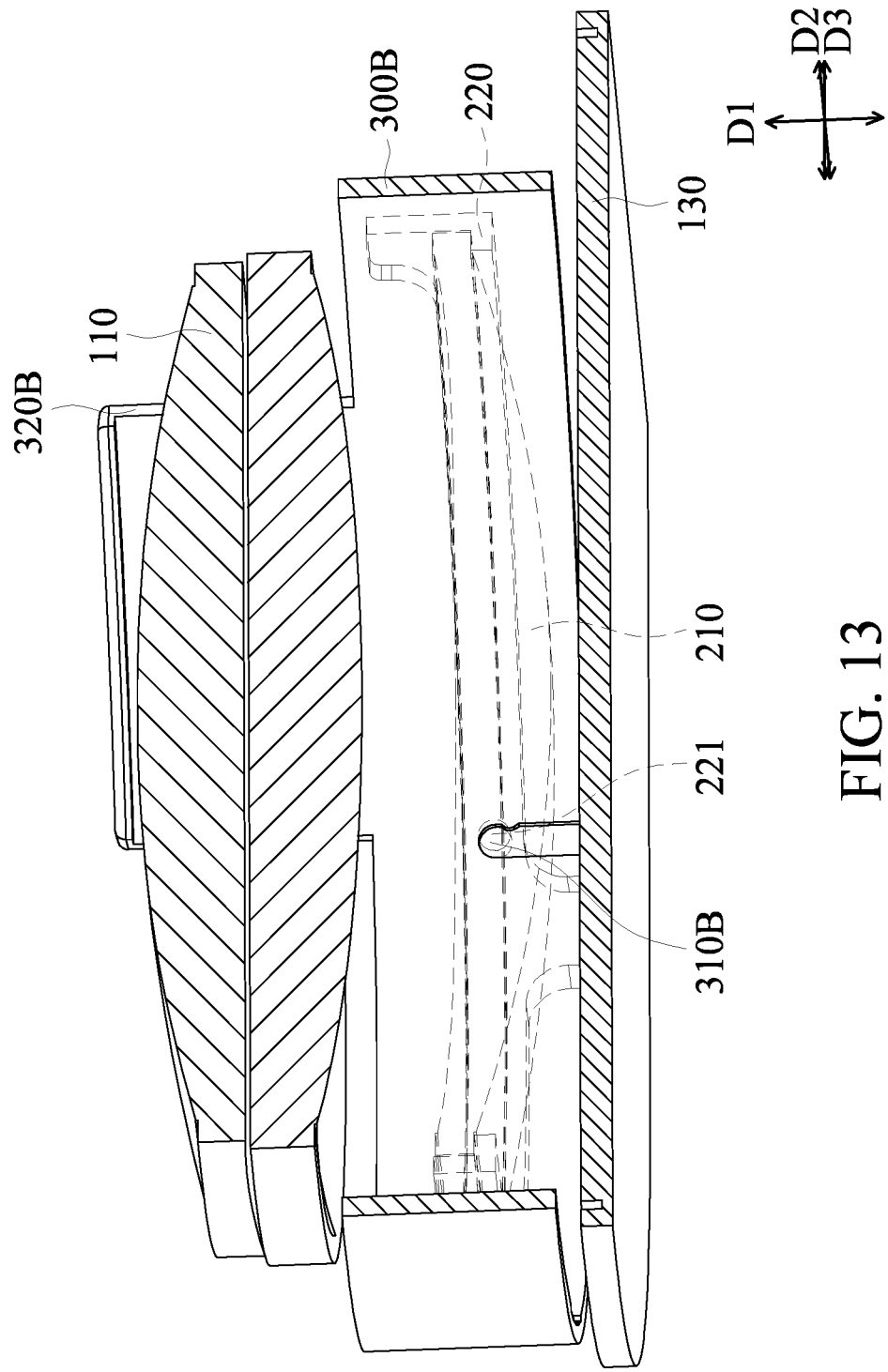
FIG. 13 is a cross-sectional view of a partial structure of the optical adjustment mechanism of wearable device cut along the C-C line in FIG. 10.
Figure 14:
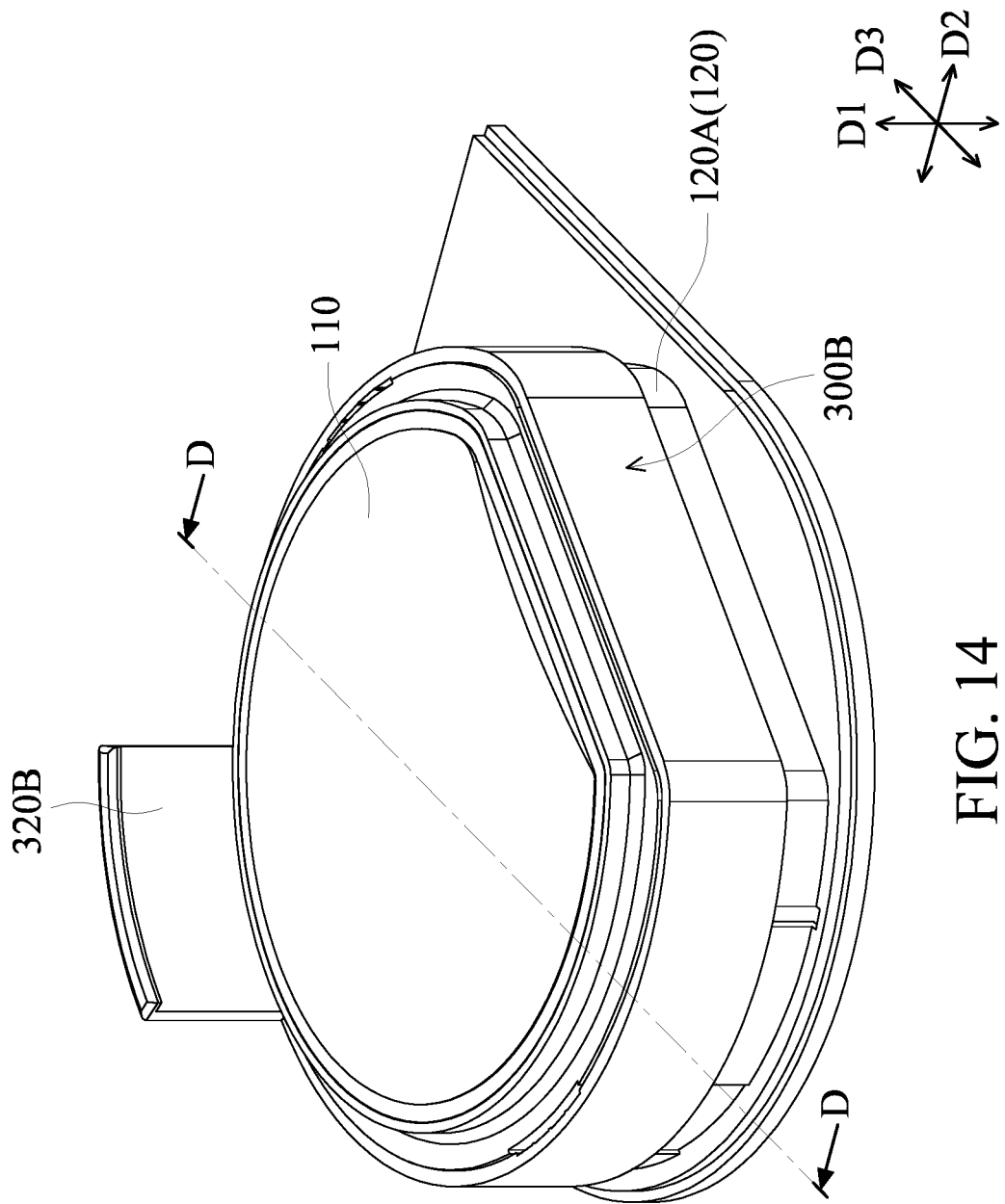
FIG. 14 is a perspective view of the optical adjustment mechanism of wearable device according to another embodiment of the present disclosure.
Figure 15:
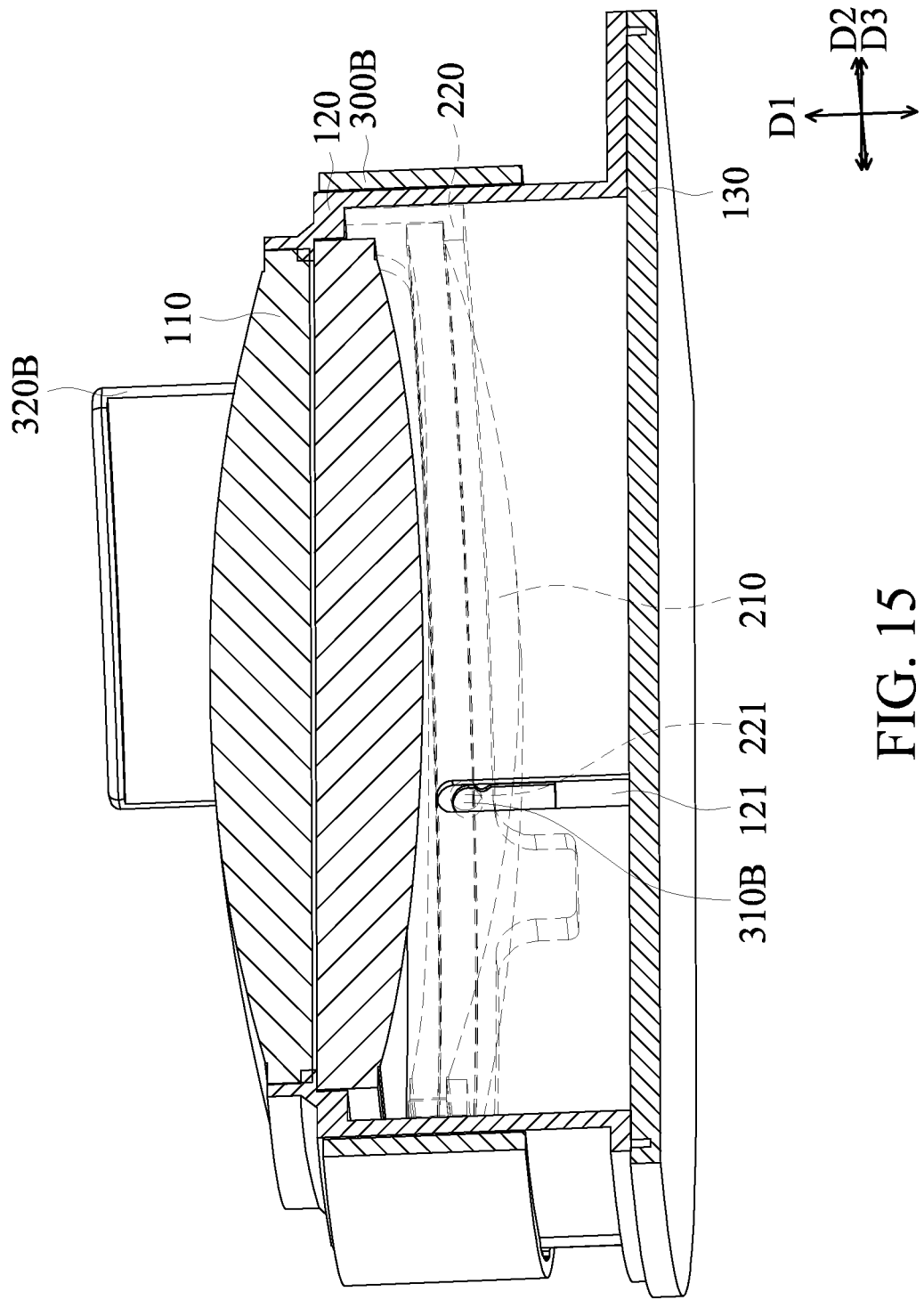
FIG. 15 is a cross-sectional view of a partial structure of the optical adjustment mechanism of wearable device cut along the D-D line in FIG. 14.
Figure 16:
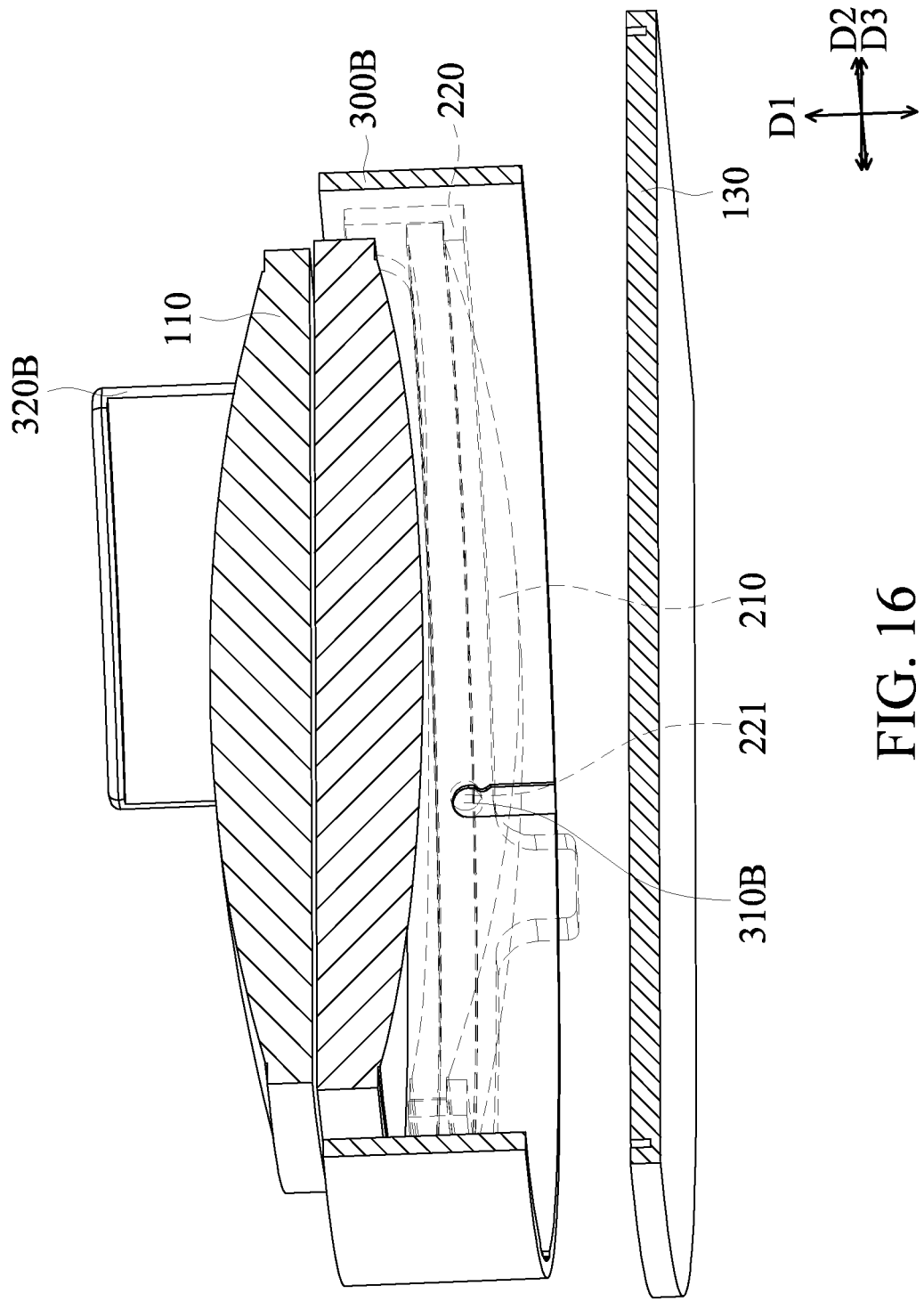
FIG. 16 is a cross-sectional view of a partial structure of the optical adjustment mechanism of wearable device cut along the D-D line in FIG. 14.

Refer to FIG. 10 to FIG. 16 to describe how the adjusting element 300B is adjusted to make the movable portion 200 move relative to the fixed portion 100. FIG. 12 is a cross-sectional view of the optical adjustment mechanism 1B of wearable device cut along the line C-C in FIG. 10. FIG. 13 is a cross-sectional view of a partial structure of the optical adjustment mechanism 1B of wearable device cut along the line C-C in FIG. 10. FIG. 14 is a perspective view of the optical adjustment mechanism 1B of wearable device according to another embodiment of the present disclosure. FIG. 15 is a cross-sectional view of a partial structure of the optical adjustment mechanism 1B of wearable device cut along the line D-D in FIG. 14. FIG. 16 is a cross-sectional view of a partial structure of the optical adjustment mechanism 1B of wearable device cut along the line D-D in FIG. 14. It should be noted that, in order to clearly illustrate positions of each element, the outer frame 120 is not shown in FIGS. 13 and 16, and the movable portion 200 is transparently represented by a dotted line in FIGS. 12, 13, 15 and 16.

After the user wears a wearable device on the head, the user can pull the pulling portion 320B along the first direction D1 with a hand to move the movable portion 200. FIGS. 10, 12 and 13 show an initial state of the optical adjustment mechanism 1B of wearable device, and the initial state is a state that the user has not adjusted the adjusting element 300B. At this time, as shown in FIGS. 12 and 13, the protruding portion 221 of the holder 220 passes through the limiting portion 121 of the outer frame 120 to engaged with the guiding portion 310B. There is a first distance d1 between the second optical element 210 and the first optical element 110, and the first distance d1 is a maximum distance dmax between the second optical element 210 and the first optical element 110.

As shown in FIG. 14 to FIG. 16, when the user continues to pull the adjusting element 300B to make the protruding portion 221 engaged with the guiding portion 310B be in contact with the upper edge 121e of the restricting portion 121 of the outer frame 120, the adjusting element 300B may not be pulled any more and a pulling limitation of the adjusting element 300B is reached. At this time, there is a second distance d2 which is smaller than the first distance d1 between the second optical element 210 and the first optical element 110, and the second distance d2 is a minimum distance dmin between the second optical element 210 and the first optical element 110.

That is, the user pulls the adjusting element 300B in the first direction D1 to move the second element 210 between the first distance d1 and the second distance d2 to achieve continuous diopter conversion within a certain range. When the adjusting element 300B is adjusted to an appropriate position, that is, when the user adjusts the adjusting element 300B according to his/her own eyesight, to make the image presented by the display element 130 be clearly seen, then the adjusting element 300 may be fixed by arranging the damping element 500 between the adjusting element 300B and the outer frame 120 to keep this best wearing condition of the user.

To sum up, the present disclosure provides an optical adjustment mechanism of wearable device, which includes a fixed portion, a movable portion, and an adjusting element. The fixed portion includes an outer frame connected to a first optical element, and the first optical element has an optical axis. The outer frame forms a sectional plane along a direction parallel to the optical axis. The movable portion is movable relative to the fixed portion, and includes a holder, and the holder holds a second optical element and is movably connected to the outer frame. The adjusting element connects the movable portion and the fixed portion, and the movable portion may be moved relative to the fixed portion by the adjusting element. The optical adjustment mechanism of wearable device in present disclosure has a designed chamfer structure for ergonomics, thus improving wearing comfort. In addition, the user may also adjust diopter easily according to his/her own eyesight to achieve a good virtual reality experience.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical adjustment mechanism of wearable device, comprising:
   a fixed portion, comprising:
      an outer frame, connected to a first optical element, and the first optical element has an optical axis, wherein the outer frame forms a sectional plane along a direction parallel to the optical axis;
   a movable portion, movable relative to the fixed portion, comprising:
   a holder, holding a second optical element, and movably connected to the outer frame; and
   an adjusting element, connected to the movable portion and the fixed portion, wherein the movable portion is moved relative to the fixed portion by the adjusting element,
   wherein the outer frame comprises at least one restricting portion, the holder comprises at least one protruding portion, the adjusting element comprises at least one guiding portion, and the at least one protruding portion passes through the at least one restricting portion and is received in the at least one guiding portion.

2. The optical adjustment mechanism of wearable device as claimed in claim 1, further comprising at least one fixing element, wherein the outer frame further comprises at least one fitting portion, and the adjusting element further comprises at least one limiting portion, the at least one fixing portion passes through the at least one limiting portion to fit with the at least one fitting portion, and the at least one fixing element is disposed between a left end side and a right end side of the at least one limiting portion.

3. The optical adjustment mechanism of wearable device as claimed in claim 2, wherein the adjusting element further comprises a pushing portion extending parallel to the optical axis.

4. The optical adjustment mechanism of wearable device as claimed in claim 3, wherein when the pushing portion is pushed, the fixing element is converted from being in contact with the left end side of the limiting portion to being in contact with the right end side of the limiting portion, the protruding portion of the holder moves to a maximum height along the guiding portion, and the second optical element and the first optical element have a minimum distance.

5. The optical adjustment mechanism of wearable device as claimed in claim 3, further comprising a fine-tuning portion, the fine-tuning portion comprises a fine-tuning lever and a gear, the fine-tuning lever is connected to the gear and is rotatably fixed to the outer frame, wherein an outer wall of the adjusting element is provided with a plurality of teeth, and the gear engage with the teeth.

6. The optical adjustment mechanism of wearable device as claimed in claim 1, wherein the guiding portion is a concave structure disposed on an inner wall of the adjusting element to engage with the protruding portion, wherein the adjusting element further comprises a pulling portion, which is arranged on an opposite side of the sectional plane and extends parallel to the optical axis, wherein the restricting portion is an elongated hole extending parallel to the optical axis, and has an upper edge to restrict a movement range of the movable portion.

7. The optical adjustment mechanism of wearable device as claimed in claim 6, wherein when the pulling portion is pulled along the direction parallel to the optical axis, and the protruding portion engaged with the guiding portion contacts the upper edge of the restricting portion of the outer frame, there is a minimum distance between the second optical element and the first optical element.

8. An optical adjustment mechanism of wearable device, comprising:
    a fixed portion, comprising:
    an outer frame, connected to a first optical element, and the first optical element has an optical axis, wherein the outer frame forms a sectional plane along a direction parallel to the optical axis;
    a movable portion, movable relative to the fixed portion, comprising:
    a holder, holding a second optical element, and movably connected to the outer frame;
    an adjusting element, connected to the movable portion and the fixed portion, wherein the movable portion is moved relative to the fixed portion by the adjusting element, and
    a damping element disposed between the adjusting element and the outer frame, wherein an outer wall of the outer frame is provided with at least one groove, and the damping element fills the at least one groove and is connected to the adjusting element.

9. The optical adjustment mechanism of wearable device as claimed in claim 8, wherein the adjusting element further has at least one recessed portion, and the at least one recessed portion has a concave strip structure along an inner wall of the adjusting element, and the concave strip structure is disposed to correspond to the at least one groove.

* * * * *